R. Stileman,
Fire Plug.
N° 37,466. Patented Jan. 20, 1863.

Witnesses.
Charles E Foster
Charles Howson.

Inventor.
per R. Stileman
Henry Howson

UNITED STATES PATENT OFFICE.

RICHARD STILEMAN, OF PHILADELPHIA, PENNSYLVANIA.

IMPROVEMENT IN HYDRANTS.

Specification forming part of Letters Patent No. 37,466, dated January 20, 1863.

*To all whom it may concern:*

Be it known that I, RICHARD STILEMAN, of Philadelphia, Pennsylvania, have invented an Improvement in Fire-Plugs; and I do hereby declare the following to be a full, clear, and exact description of the same, reference being had to the accompanying drawings, and to the letters of reference marked thereon.

My invention consists in combining a sluice-valve and its casing with the stem of a fire-plug, in the manner described hereinafter, so as to obviate the defects of ordinary fire-plugs, in which the conical valves and circuitous passages tend to obstruct the flow of water.

In order to enable others skilled in the art to make and use my invention, I will now proceed to describe its construction and operation.

Figure 1:
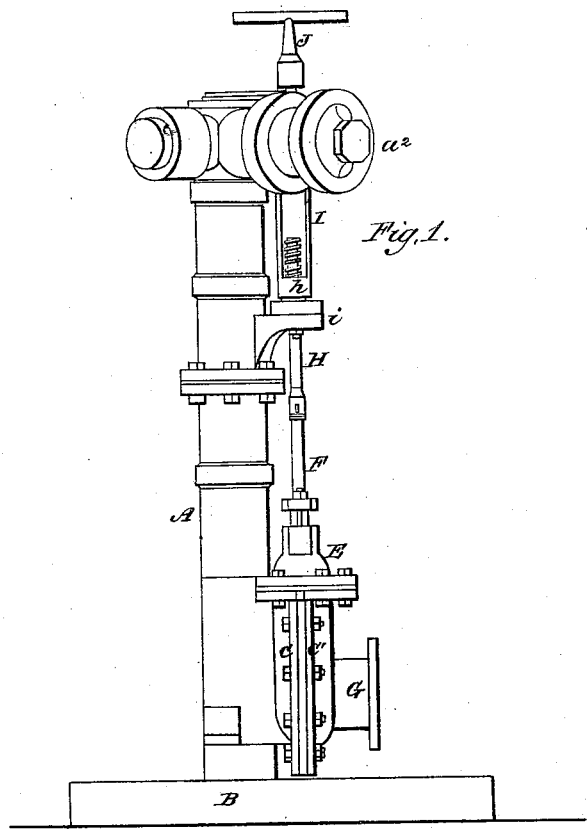
Figures 2, 3:
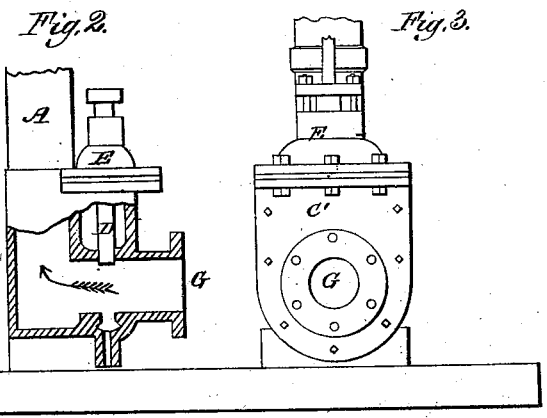
Figure 4:
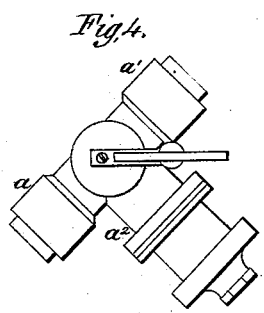

On reference to the accompanying drawings, which form a part of this specification, Figure 1 is a side view of my improved fire-plug; Fig. 2, a vertical section of the lower part of the plug; Fig. 3, a front view of Fig. 2, and Fig. 4 a plan view of the upper portion of the fire-plug.

Similar letters refer to similar parts throughout the several views.

A is the hollow stem of the fire-plug, and consists in the present instance of two pipes secured to each other. At the upper end of the stem are three branches, $a$, $a'$, and $a^2$, the branches $a$ and $a'$ being arranged for the reception of ordinary hose-couplings, while the larger branch $a^2$ is arranged to receive the coupling of larger hose, such as are used in connection with steam fire-engines. The stem A rests on and is secured to a foundation-plate, B, which is bedded in the soil at such a depth beneath the surface that the branches at the top of the stem are at a proper height above the ground. To one side and near the lower end of the stem A is cast one half, C, of the casing, in which the sluice-valve D operates, the other half, C', of this casing being bolted to the first half, as shown in Fig. 1, and the casing being surmounted with a cover, E, through a stuffed box on which passes a rod, F, the lower end of the latter being connected to the valve D. A branch, G, for the reception of the end of the pipe which communicates with the main water-pipe projects from the front half, C', of the casing of the sluice-valve. A rod, H, attached to the upper end of the valve rod F, passes through and is guided by a projection, $i$, on one side of the stem A, the screwed portion of this rod being adapted to a nut, $h$, which forms a part of the yoke I, the upper end of the latter turning in a bracket secured to the top of the stem. This yoke has a square termination at the top for fitting into the key J, by turning which the sluice-valve may be raised or lowered at pleasure, and more or less water admitted to the interior of the stem through the branch G.

In fire-plugs as heretofore constructed conical valves have been used for admitting the water to and cutting it off from the stems. These valves tend to obstruct the flow of water to the stem, and involve the necessity of adopting a system of complex and tortuous passages.

It will be readily seen that by combining the sluice-valve and its casing with the stem A, in the manner illustrated and described, the passage for the flow of water from the branch G to the stem A is direct and uninterrupted by the valve, and that the above-mentioned objectionable features in the ordinary fire-plug are avoided.

I claim as my invention and desire to secure by Letters Patent—

The sluice-valve D, with its casing C C', when combined with and arranged in respect to the stem A of a fire-plug as and for the purpose set forth.

In testimony whereof I have signed my name to this specification in the presence of two subscribing witnesses.

RICHD. STILEMAN.

Witnesses:
HENRY HOWSON,
JOHN WHITE.